(12) United States Patent  
Austin (10) Patent No.: US 9,069,950 B2  
(45) Date of Patent: Jun. 30, 2015

(54) METHOD AND COMPUTER DEVICE TO CONTROL SOFTWARE FILE DOWNLOADS

(71) Applicant: Avecto Limited, Cheadle, Cheshire (GB)

(72) Inventor: Mark James Austin, Manchester (GB)

(73) Assignee: Avecto Limited, Cheadle Cheshire (GB)

( * ) Notice: Subject to any disclaimer, the term of this patent is extended or adjusted under 35 U.S.C. 154(b) by 0 days.

(21) Appl. No.: 13/689,614

(22) Filed: Nov. 29, 2012

(65) Prior Publication Data

US 2013/0139216 A1    May 30, 2013

(30) Foreign Application Priority Data

Nov. 30, 2011   (GB) .................................. 1120611.7

(51) Int. Cl.  
*G06F 11/30* (2006.01)  
*G06F 21/51* (2013.01)  
(Continued)

(52) U.S. Cl.  
CPC .............. *G06F 21/51* (2013.01); *G06F 21/554* (2013.01); *G06F 21/564* (2013.01); *G06F 21/566* (2013.01); *G06F 21/556* (2013.01); *G06F 21/121* (2013.01); *G06F 21/53* (2013.01);  
(Continued)

(58) Field of Classification Search  
CPC ..... G06F 21/556; G06F 21/121; G06F 21/51; G06F 9/44589; G06F 21/53; G06F 21/544; G06F 21/54; G06F 21/56; G06F 21/566; G06F 21/561; G06F 21/562; G06F 21/564; G06F 21/565; H04L 63/126  
USPC ................... 713/180, 187, 188; 726/1, 22, 30  
See application file for complete search history.

(56) References Cited

U.S. PATENT DOCUMENTS 6,092,194 A * 7/2000 Touboul ........................ 726/24  
6,754,691 B1 * 6/2004 Gomi et al. .................... 709/202  
(Continued)

FOREIGN PATENT DOCUMENTS

WO        02103968 A1    12/2002

OTHER PUBLICATIONS

Cova, Marco, Christopher Kruegel, and Giovanni Vigna. "Detection and analysis of drive-by-download attacks and malicious JavaScript code." Proceedings of the 19th international conference on World wide web. ACM, 2010.*

(Continued)

*Primary Examiner* — Michael Simitoski  
(74) *Attorney, Agent, or Firm* — Knobbe Martens Olson & Bear LLP (57) ABSTRACT

A computer device includes a download unit which downloads one or more files into a storage device. A file logging unit records a resource locator identifying a source network location of the file, when the file is downloaded, and associates the resource locator with a first fingerprint of the file. A system policy unit stores the resource locator associated with a process control policy relevant to the file. A process control unit is arranged to obtain a second fingerprint of the file upon launching a process in a runtime execution environment, retrieve the resource locator from the file logging unit by matching the second fingerprint with the first fingerprint, retrieve the process control policy from the system policy unit according to the retrieved resource locator, and selectively apply process execution privileges which determine execution of the process in the runtime execution environment according to the retrieved process control policy.

19 Claims, 3 Drawing Sheets

(51) Int. Cl.

| | | |
|---|---|---|
| *G06F 21/55* | (2013.01) | |
| *G06F 21/56* | (2013.01) | |
| *G06F 21/12* | (2013.01) | |
| *G06F 21/53* | (2013.01) | |
| *G06F 21/54* | (2013.01) | |
| *H04L 29/06* | (2006.01) | |
| *G06F 12/14* | (2006.01) | |

(52) U.S. Cl.
CPC ............ *G06F21/565* (2013.01); *G06F 21/561* (2013.01); *G06F 21/54* (2013.01); *G06F 21/562* (2013.01); *G06F 21/12* (2013.01); *G06F 21/56* (2013.01); *H04L 63/126* (2013.01)

(56) References Cited

U.S. PATENT DOCUMENTS

| | | | | |
|---|---|---|---|---|
| 6,948,183 | B1* | 9/2005 | Peterka | 725/25 |
| 7,024,403 | B2* | 4/2006 | Kyler | 1/1 |
| 7,530,106 | B1* | 5/2009 | Zaitsev et al. | 726/24 |
| 7,725,941 | B1* | 5/2010 | Pavlyushchik | 726/24 |
| 8,250,657 | B1* | 8/2012 | Nachenberg et al. | 726/25 |
| 8,484,739 | B1* | 7/2013 | Seshadri | 726/25 |
| 8,527,978 | B1* | 9/2013 | Sallam | 717/168 |
| 8,572,007 | B1* | 10/2013 | Manadhata et al. | 706/12 |
| 8,607,335 | B1* | 12/2013 | Liu et al. | 726/22 |
| 8,950,007 | B1* | 2/2015 | Teal et al. | 726/30 |
| 2002/0099952 | A1* | 7/2002 | Lambert et al. | 713/200 |
| 2002/0144137 | A1* | 10/2002 | Harrah et al. | 713/200 |
| 2002/0174102 | A1* | 11/2002 | Kyler | 707/1 |
| 2002/0198963 | A1* | 12/2002 | Wu et al. | 709/219 |
| 2005/0246522 | A1* | 11/2005 | Samuelsson et al. | 713/150 |
| 2006/0150256 | A1* | 7/2006 | Fanton et al. | 726/27 |
| 2007/0174911 | A1* | 7/2007 | Kronenberg et al. | 726/22 |
| 2007/0199060 | A1* | 8/2007 | Touboul | 726/11 |
| 2007/0199068 | A1* | 8/2007 | Russinovich et al. | 726/16 |
| 2008/0016339 | A1* | 1/2008 | Shukla | 713/164 |
| 2008/0022370 | A1* | 1/2008 | Beedubail et al. | 726/4 |
| 2008/0046977 | A1* | 2/2008 | Park | 726/4 |
| 2008/0256631 | A1 | 10/2008 | Zvi | |
| 2008/0301766 | A1* | 12/2008 | Makino et al. | 726/1 |
| 2009/0049550 | A1* | 2/2009 | Shevchenko | 726/23 |
| 2009/0141895 | A1* | 6/2009 | Anderson et al. | 380/252 |
| 2010/0242111 | A1* | 9/2010 | Kraemer et al. | 726/22 |
| 2011/0047613 | A1* | 2/2011 | Walsh | 726/16 |
| 2011/0167050 | A1* | 7/2011 | Fanton et al. | 707/698 |
| 2011/0296487 | A1* | 12/2011 | Walsh | 726/1 |
| 2012/0017275 | A1* | 1/2012 | Harmonen | 726/24 |
| 2012/0066759 | A1* | 3/2012 | Chen et al. | 726/15 |
| 2012/0072546 | A1* | 3/2012 | Etchegoyen | 709/219 |
| 2012/0311659 | A1* | 12/2012 | Narain et al. | 726/1 |
| 2013/0254880 | A1* | 9/2013 | Alperovitch et al. | 726/22 |
| 2015/0089645 | A1* | 3/2015 | Vandergeest | 726/23 |

OTHER PUBLICATIONS

Peddinti, Sai Teja, and Nitesh Saxena. "On the privacy of web search based on query obfuscation: a case study of TrackMeNot." Privacy Enhancing Technologies. Springer Berlin Heidelberg, 2010.*

International Search Report, International app. No. PCT/GB2012/052935. Date of mailing: May 6, 2013. European Patent Office, Rijswijk, Netherlands.

* cited by examiner

METHOD AND COMPUTER DEVICE TO CONTROL SOFTWARE FILE DOWNLOADS

CROSS-REFERENCE TO RELATED APPLICATIONS

This application claims priority from foreign application GB1120611.7 entitled "Method and Computer Device to Control Software Downloads," which was filed in the United Kingdom on Nov. 30, 2011, and which is hereby incorporated by reference in its entirety.

TECHNICAL FIELD

The present invention relates generally to the field of computers and computer devices. More particularly, the present invention relates to a method and apparatus for controlling downloaded software files.

BACKGROUND

A computer device often needs to download and install new software. Typically, the new software is provided as one or more files, which are downloaded by the computer device from a location on a network, such as a local area network (LAN) or the Internet.

It is well known that downloaded software presents a significant risk to the security and reliability of the computer device, by exposing the computer device to unwanted software such as infections and malware (malicious software). Therefore, there is a need to provide a mechanism to control the downloading of software files to a computer device.

The exemplary embodiments have been provided with a view to addressing at least some of the difficulties that are encountered in current computer devices, whether those difficulties have been specifically mentioned above or will otherwise be appreciated from the discussion herein.

SUMMARY

According to the present invention there is provided a computer device, a method and a computer-readable storage medium as set forth in the appended claims. Other, optional, features of the invention will be apparent from the dependent claims, and the description which follows.

At least some of the following exemplary embodiments provide an improved mechanism for downloading software files to a computer device. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example aspect there is provided a computer device comprising a file logging unit arranged to record a resource locator identifying a source network location of a file when the file is downloaded to a storage unit of the computer device, and to associate the resource locator with a first fingerprint of the file, a system policy unit arranged to store the resource locator associated with a process control policy relevant to the file, and a process control unit arranged to obtain a second fingerprint of the file upon launching a process in a runtime execution environment based on the file, retrieve the resource locator from the file logging unit by matching the second fingerprint with the first fingerprint, retrieve the process control policy from the system policy unit according to the retrieved resource locator, and selectively apply process execution privileges which determine execution of the process in the runtime execution environment according to the retrieved process control policy.

In one aspect, the process control unit is arranged to selectively allow or deny execution of the process in the runtime execution environment according to the process control policy.

In one aspect, the process control unit is further arranged to dynamically grant elevated execution privileges to the process when specified by the process control policy.

In one aspect, the process control unit is further arranged to dynamically grant local administrator privileges to the process when specified by the process control policy.

In one aspect, the system policy unit is arranged to store a plurality of predetermined resource locators each associated with a respective process control policy.

In one aspect, each process control policy determines execution privileges of the files downloaded from the source network location identified by the respective resource locator.

In one aspect, the file logging unit is arranged to record the resource locator each time a file is downloaded to the computer device, thereby logging the resource locator and the fingerprint related to each downloaded file.

In one aspect, the computer device further includes a download unit which downloads the one or more files into the storage device. In one aspect, the download unit comprises a browser.

In one aspect, the file logging unit is applied within a browser of the computer device used to download the files to the computer device from a network. In one aspect, the file logging unit is a plug-in to the browser.

In one aspect, the file logging unit is arranged to obtain the fingerprint of the file as a cryptographic hash.

In one aspect, the process control unit includes a dynamic linked library which is hooked into the process upon starting the process in the runtime execution environment.

In one aspect, the process control unit intercepts a call made to an application programming interface to an operating system of the computer device to create a new process.

In one aspect, the process control unit is a kernel driver within an operating system of the computer device and is arranged to intercept a call made through an application programming interface to the operating system of the computer device to create a new process.

In one aspect, the process control unit is a kernel driver within an operating system of the computer device and is arranged to receive a notification when a new process starts.

In one example aspect there is provided a method of controlling downloaded files in a computer device, the method including the steps of recording a resource locator identifying a source network location of a file when the file is downloaded to the computer device, associating the resource locator with a first fingerprint of the file; providing a process control policy relevant to the file, wherein the process control policy is associated with the resource locator, obtaining a second fingerprint of the file upon launching a process in a runtime execution environment based on the file, retrieving the resource locator according to the second fingerprint and the first fingerprint, retrieving the process control policy according to the retrieved resource locator, and selectively applying process execution privileges which determine execution of the process according to the retrieved process control policy.

In one example aspect there is provided a computer-readable storage medium having instructions recorded thereon which, when implemented by a computer device, cause the computer device to be arranged as set forth herein and/or which cause the computer device to perform the method as set forth herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed below, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION

The exemplary embodiments of the present invention will be discussed in detail in relation to Microsoft™ Windows™ operating systems. However, the teachings, principles and techniques of the present invention are also applicable in other exemplary embodiments. For example, the exemplary embodiments are also applicable to other operating systems.

Figure 1:
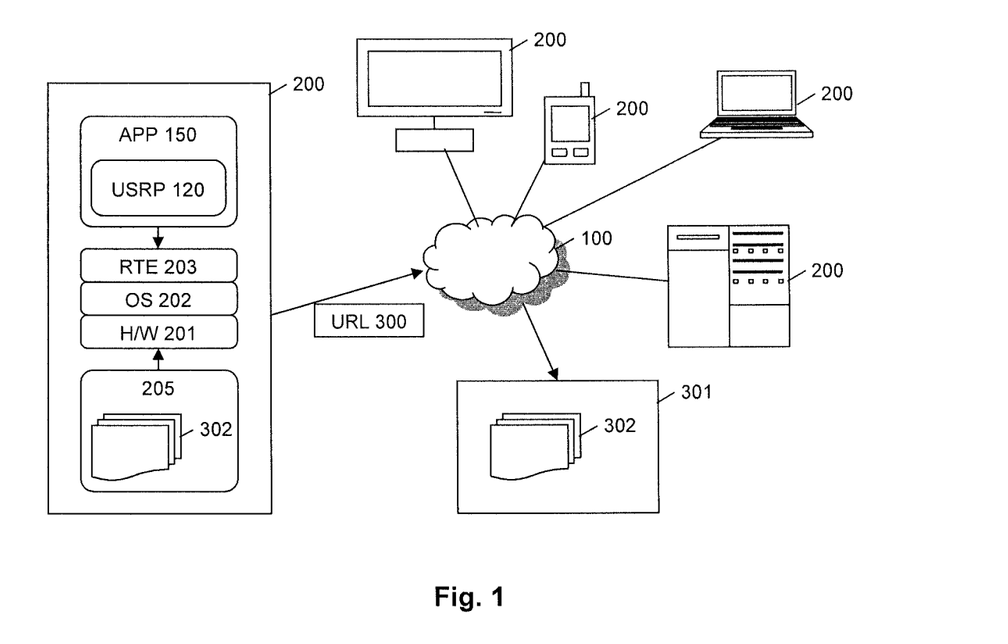
FIG. 1 is a schematic overview of example computer devices in which the exemplary embodiments may be applied.

FIG. 1 is a schematic overview of a computer device 200 according to an exemplary embodiment of the present invention. In this example, the host computer device 200 includes physical hardware (HAW) 201 such as memory, processors, I/O interfaces, backbone, power supply and so on. An operating system (OS) 202 provides a multitude of components, modules and units that coordinate to provide a runtime environment (RTE) 203 which supports execution of a plurality of processes, including one or more user processes (USRP) 120. The processes 120 may relate to one or more application programs (APP) 150 which the user desires to execute on the computer device 200.

As illustrated in FIG. 1, the computer device 200 may take any suitable form. As one example, the computer device 200 is a relatively powerful server computer. In another example, the computer device 200 is a user-oriented computer device such as a desktop PC. As another example, the computer device 200 is a portable user-oriented computer device such as a laptop computer, notebook, webbook, tablet, PDA or smartphone. As further examples, the computer device 200 may have other form factors or be incorporated within another device, such as an entertainment device for video and/or audio processing or output (gaming device, set-top box, television, music player).

As shown in FIG. 1, the computer device 200 employs a resource locator 300 which identifies a location 301 within a network 100 where one or more files 302 are located. For example, a network based on Internet protocols may use a uniform resource locator (URL) with syntax consistent with RFC3986. The computer device 200 may then download the desired file or files 302 from the source location 301 and save these files in a storage unit 205 which is accessible locally to the computer device 200, such as a local hard drive or solid state storage (e.g. Flash RAM).

Figure 2:
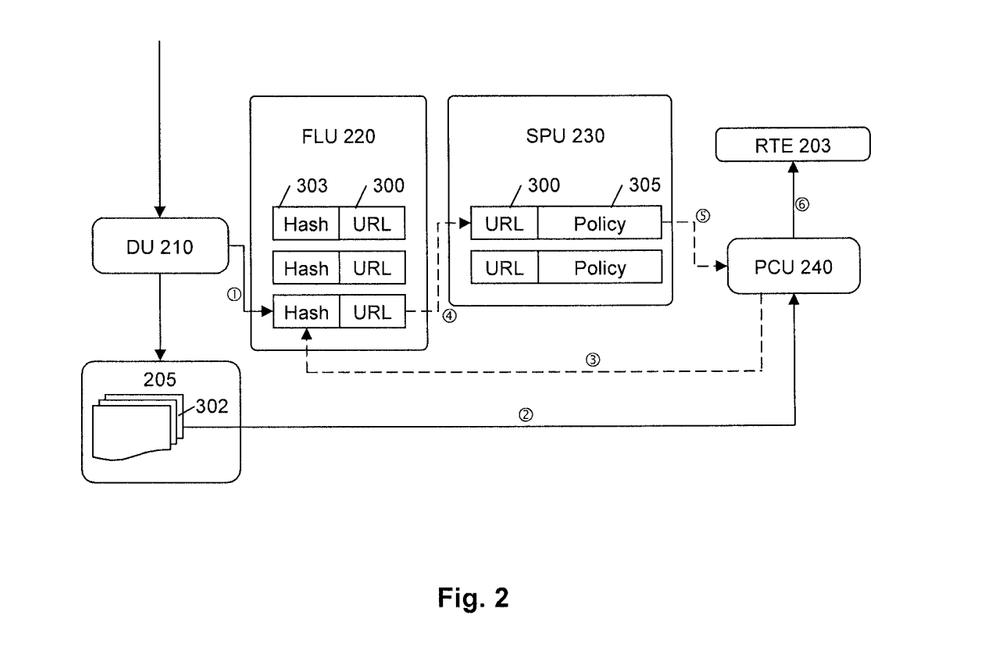
FIG. 2 is a schematic diagram showing the example computer device and a related method.

FIG. 2 is a schematic diagram showing the example computer device 200 in more detail. A download unit (DU) 210 is arranged to download the files 302 onto the storage unit 205. In one example, the download unit 210 comprises an Internet browser. As will be familiar to those skilled in the art, the download unit 210 searches for and retrieves the files 302 across the network 100 from the location 301 specified by the resource locator (URL) 300.

As shown in FIG. 2, the example computer device 200 may further comprise a file logging unit (FLU) 220, a system policy unit (SPU) 230, and a process control unit (PCU) 240.

In one example embodiment, the file logging unit 220 is suitably provided as a component associated with the download unit 210. In one embodiment, the file logging unit 220 is a plug-in to the Internet browser 210. The file logging unit 220 is arranged to record the URL 300 each time one of the files 302 is downloaded. Also, when a file download process has been completed, the file logging unit 220 obtains a fingerprint 303 of the newly downloaded file 302. The URL 300 and the fingerprint 303 are stored together by the file logging unit 220. For example, the file logging unit 220 may store the URL 300 and the related file fingerprint 303 securely within a table or database locally within the computer device 200. Alternately, the file logging unit 220 may export the URL and fingerprint to another suitable location on the network 100, such as a database on a file logging server (not shown). A centrally accessible logging database or logging lookup table advantageously allows data to be combined from many different individual computer devices 200 and shared commonly between them. Also, the central file logging server allows users to roam between computers or to share downloads with other users.

The fingerprint 303 is suitably a hash. The hash may be a cryptographic hash. In one example, the fingerprint is taken using the SHA-1 hashing algorithm. However, many other fingerprinting and hashing algorithms are also available and may be applied in other example embodiments.

In the following example embodiments, the system policy unit 230 is provided locally within the computer device 200, as will be further explained below. In another example embodiment, the system policy unit 230 may be provided at a remote location such as on a system policy server (not shown) which is in communication with the computer device 200 across the network 100.

The system policy unit 230 stores a plurality of resource locators (URL) 300. Each URL 300 is associated with a process control policy 305. Suitably, the URLs 300 and the policies 305 stored by the system policy unit 230 are determined and defined in advance. Thus, an administrator may determine URLs of interest and set a policy appropriate to each URL or group of URLs. Each policy 305 is used to control execution of processes on the computer device 200 relevant to the files 302 downloaded from that determined location.

The process control unit (PCU) 240 is provided to selectively enforce the policies 305 stored in the system policy unit 230. In the example embodiments, the process control unit 240 is arranged to retrieve a relevant policy 305 when a process is started or launched into the runtime execution environment (RTE) 203. The process control unit 240 suitably allows, or denies, execution of the process according to the predetermined policy 305.

In operation, the download unit 210 downloads the file or files 302. At step 1, the file logging unit 220 records the relevant URL 300 indicating the network location 301 as the source of the downloaded file 302, and the fingerprint 303 of the downloaded file 302. Later, at step 2, a user process 120 is started with respect to the downloaded files 302 which will cause the downloaded file or files 302 to be executed on the computer device 200. For example, an executable file or a software installation package is launched. It is possible that the downloaded files 302 are stored within the storage unit 205 for some length of time, and then, some hours or days later, the installation process is initiated. At step 3, the process control unit 240 obtains a fingerprint of the file 302 where execution is now desired. This second fingerprint is compared with the fingerprint(s) stored earlier by the file logging unit 220 and, when matched, returns the URL 300 identifying the source network location 301 of this downloaded file 302. The obtained URL is matched against the predetermined URLs in the system policy unit 230 at step 4, thereby retrieving one of the predefined policies 305. At step 5, the obtained policy 305 is applied by the process control unit 240.

As mentioned above, the process control unit 240 is suitably arranged to selectively allow, or block, the intended process based on the conditions set in the policy 305. That is, the process control unit 240 is suitably configured to selectively allow the application to run or install on the computer device 200. Typically this may involve unpacking the downloaded file 302, and deploying an application program into the runtime environment 203 including providing links between the downloaded software application and supporting resources, such as libraries (e.g. DLLs), on the computer device 200.

Figure 3:
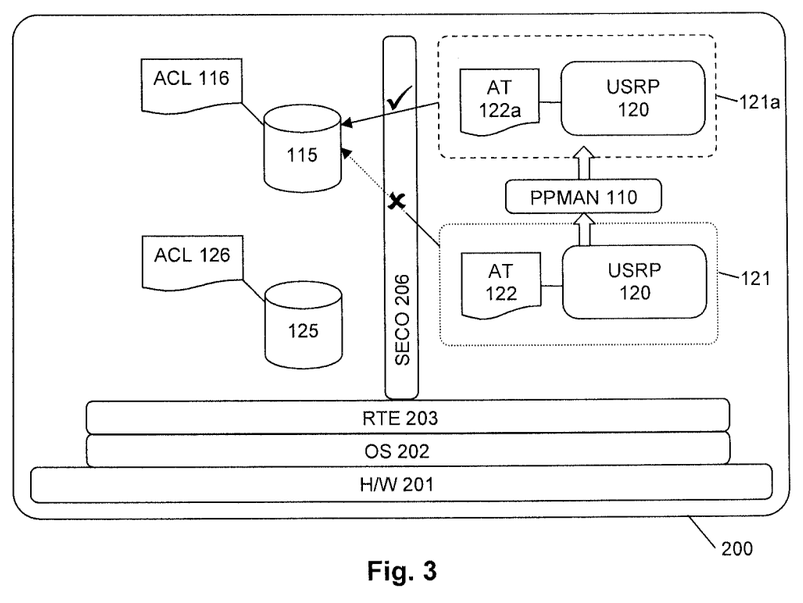
FIG. 3 is a schematic diagram showing the example computer device in more detail concerning a process privilege management mechanism.

FIG. 3 is a schematic diagram showing the example computer device in more detail. Here, the computer device 200 includes a plurality of resources 115, 125. These resources 115, 125 are the components of the computer device that the processes 120 will rely upon in order to carry out their execution. For example, the resources 115, 125 may include installed software, system services, drivers, files and/or registry settings.

In one example embodiment, the process control unit 240 may be arranged to dynamically grant elevated execution privileges when specified by the process control policy 305, such as granting local administrator privileges to the process 120 which allows access to resources 115, 125 of the computer device 200 that would otherwise be restricted. Typically, the access rights of the local administrator are required in order to successfully install a new software application.

As shown in FIG. 3, the operating system 202 may include a security module (SECO) 206 which is provided to enforce security within the computer device 200. As one example, the security module 206 is provided by the Windows™ operating system as supplied by Microsoft Corp of Redmond, Wash., USA, under the trademarks Windows NT, Windows 2000, Windows XP, Windows Vista, Windows Server 2003, Windows Server 2008, and Windows 7, amongst others. The security module 206, which also termed a security sub-system or security manager, suitably enacts the Windows security model as described, for example, in "Windows Security Overview" published 10 Jun. 2011 by Microsoft Corporation.

Each process 120 that a user initiates will be run in a security context 121 that derives access rights and permissions from the user's account. To this end, each process 120 is provided with an access token (AT) 122. The access token 122 typically carries the security identity (SID) of the user and SIDs of any other security groups to which the user belongs. The access token 122 thus defines the privileges as held on this host computer 200 by the user and the relevant security groups.

In the example embodiment, the security module 206 is arranged to perform an access check when a user process 120 requests access to any of the resource 115, 125. The security module 206 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

Usually, the security module (SECO) 206 in the operating system 202 is sufficient to prevent the user process 120 from inappropriately accessing certain key resources 115, while allowing the user process 120 to access appropriate user resources 125, according to the respective access control list 116, 126. For example, the user process 120 is able to read from, but not write to, a file of the key resources 115. Typically, the defined access types will depend upon the type of resource being accessed. For example, storage is typically defined by read and write access rights, while a process may have terminate access rights which determine whether or not a request to terminate that process will be actioned by the operating system 202. As noted above, a user-level security context 121 is based on the user as the security principal and the access token 122 is set accordingly. Suitably, in a system which adopts a least-privilege access model, the user-level security context 121 is deliberately restricted to a minimal set of access rights.

In practice, it is common for a user to be included in a security group, such as the local administrator security group, so that application programs desired by the user will install and operate correctly without needing additional support from a higher-authorized user account (such as IT administrator personnel). Where a user is included in such a privileged security group, all of the user process 120 initiated by that user will then be granted the higher-level privilege rights, such as local administrator rights, indiscriminately. Thus, granting local administrator rights, or similar higher privileges, generally allows all user processes 120 to access many of the key resources 115 of the computer system, but in an indiscriminate manner. Hence, it is desired to achieve the desired operation of the user processes, but without granting local administrator rights indiscriminately to the user.

In this example, the process control unit 240 includes a privilege management module (PPMAN) 110. This module 110 is arranged to perform dynamic process privilege reassignment, whereby the user process 120 is examined and selectively provided with an adjusted set of privileges. Typically, the privileges of the user process 120 are elevated above an initial level. However, it is also possible to selectively degrade the privilege level of a particular user process using the same adjustment mechanism.

As shown in FIG. 3, the user process 120 is granted a privileged user security context 121a by the privilege management module 110. This can be considered as a dynamic elevation of the privilege level of the user process 120, so that the specific user process 120 is able to achieve a desired, legitimate function which requires greater access rights than were available initially. The process 120 is to be elevated is provided with a new access token 122a, which is created based on the initial access token 122 of that process. As one example, the SID of the local administrator group is added to this new access token 122a, and consequently the process 120 now obtains the privileges and integrity level of the local administrator. The user process 120 is then assigned the new access token 122a, such as by stopping and restarting the process, and thus the privileged user security context 121a is now applied to that user process 120.

Figure 4:
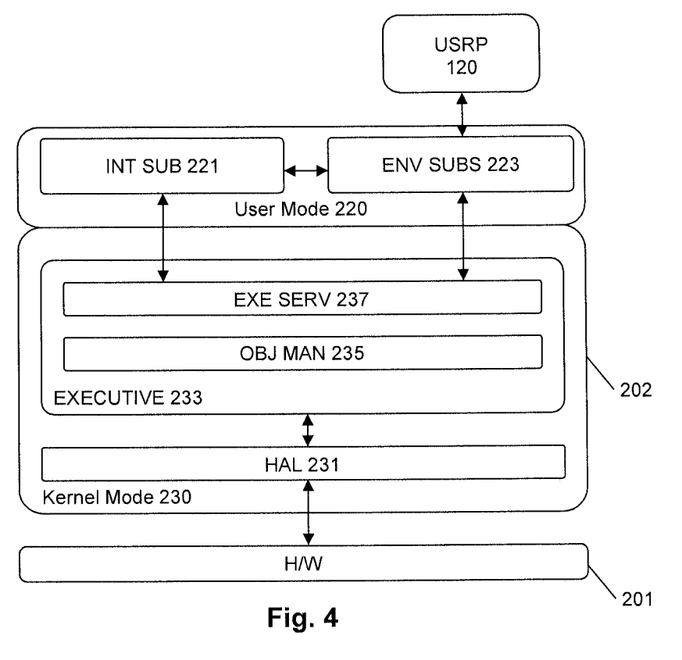
FIG. 4 is a schematic diagram showing an example operating system of the computer device in more detail.

FIG. 4 is a schematic diagram showing the example computer device 200 in more detail. In particular, FIG. 4 shows internal components within the operating system OS 202. In the example embodiment, the operating system 202 is based on Windows NT and includes two main components, namely the user mode 220 and the kernel mode 230. The user mode 220 includes integral subsystems (INT SUB) 221 such as workstation service, server service and the security module 206 as discussed above. The user mode 220 also includes environment subsystems (ENV SUB) 223 such as a Win32 environment subsystem, a POSIX environment subsystem and an OS2 environment subsystem to support user programs, including the user processes 120 as discussed above. These programs and subsystems in the user mode 220 have limited access to system resources. Meanwhile, the kernel mode 230 has unrestricted access to the computer device, including system memory and external devices, etc. The kernel mode 230 includes a hardware abstraction layer (HAL) 231 which interfaces with the physical hardware H/W 201, and a plurality of services, which together are termed the Executive 233. The Executive 233 may include an Object Manager (OBJ MAN) 235 and other services (EXE SERV) 237.

The object manager 235 is an executive subsystem which controls access to objects. The object manager 235 considers each of the resources 115, 125 as an object, including both physical resources such as storage device or peripheral devices and a logical resource such as files or containers. All other executive subsystems, including particularly system calls, pass through the object manager 235 in order to gain access to the resources 115, 125. In operation, the object manager 235 creates and inserts new objects, which makes the object accessible through a handle. Generally speaking, the handle is a unique numerical identifier which identifies that object (resource) to the object manager 235. Each object created by the object manager 235 is stored in an object table, and each entry in the object table may include the object name, security attributes, a pointer to its object type, and other parameters. Typically, the operating system 202 is configured so that every request to access a resource passes through the object manager 235.

Figure 5:
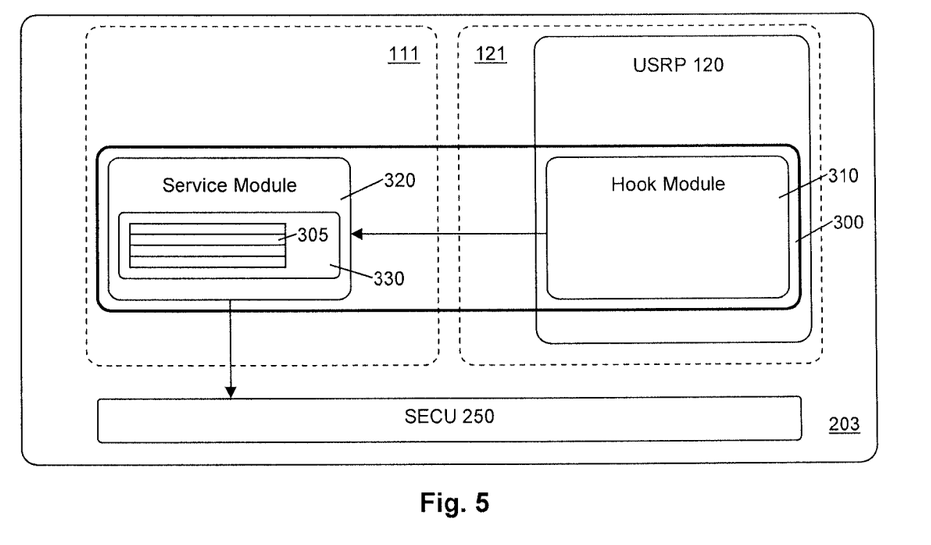
FIG. 5 is a schematic diagram showing the example computer device in more detail concerning a hook and service mechanism.

FIG. 5 is a schematic diagram showing the example computer device in more detail concerning an example hook module 310 and service module 320. Here, the process control unit 240 of FIG. 2 may include the hook module 310 in order to intercept system calls made by the user processes 120. Also, the system policy unit 230 of FIG. 2 may include the service module 320.

As shown in FIG. 5, the example computer device 200 provides the execution environment 203 to execute the user process 120 according to the user security context 121. As noted above, the user security context 121 ordinarily defines the access privileges of the user process 120 with respect to the plurality of resources 115, 125 that are available in the execution environment 203. A security unit 250 is arranged to selectively permit, or deny, access by the user process 120 to the plurality of resources 115, 125. In this example, the security unit 250 includes the security module 206 and the object manager 235 as discussed above.

In operation, the user process 120 makes a system call toward the security unit 250 to request the creation of a new process within the execution environment 203. In the example embodiment, the hook module 310 is embedded within the user process 120. In one example, the hook module 310 is a DLL (dynamic linked library) component that hooks into each user process 120. The hook module 310 suitably hooks into the user process 120 as that process is started within the execution environment 203. In the example embodiment, the hook module 310 is arranged to intercept all relevant system calls. In the Windows operating system, the Windows API (application programming interface) provides a set of well-defined system calls, including calls which relate to the creation of a new process.

The hook 310 is arranged to intercept the API call, and may then communicate with the service module 320 in order to determine the relevant policy 305 to be applied. The hook 310 and the service module 320 may communicate by any suitable form of inter-process communication (IPC). In the example embodiments, the service module 320 executes in a privileged security context 111. As an example, the service module 320 may run in the privileged security context 111 of the SYSTEM account. Typically, this privileged security context 111 gives unrestricted access to local resources.

The service module 320 is arranged to validate the request from the hook 310 against the policies 305 as recorded in a policy table 330. In this example, the validation is based on the URL of the downloaded file 302, but may also include checking a file name of the user process 120, the owner of the process 120 (i.e. the user), or other suitable criteria. The policy table 330 provides a configurable mechanism to determine whether or not the requested access will be permitted or denied. In an example embodiment, non-exact matching is also permitted within the policy table 330, such as by wild card matching. In the example embodiment, the service module 320 suitably identifies whether or not a predetermined policy 305 exists with reference to this request, i.e. using the relevant fingerprint 303 of the file 302 as an index to retrieve the related source location URL 300, and using the retrieved URL 300 as an index to the respective policy 305.

In the example embodiments the WIN32 API functions will call their native API counterparts. Here the native API provides the interface between the user mode 220 and the kernel mode 230 within the operating system 202 as noted above. Therefore, in the example embodiments, the hook module 310 may be implemented by intercepting the Win32 API or the native API functions. For example, a file can be created or opened through the Win32 API via the CreateFile function or through the native API via the ZwCreateFile and ZwOpenFile functions. Thus, the process control module 240 of FIG. 2 can include the hook module 310 as a kernel driver within the operating system 202. The process control module 240 can also be configured to receive notifications from the operating system when a new process is created, and then intercept the new process at that point.

In summary, the exemplary embodiments have described an improved mechanism to control downloaded software files within a computer device. The industrial application of the exemplary embodiments will be clear from the discussion herein.

Although a few preferred embodiments have been shown and described, it will be appreciated by those skilled in the art that various changes and modifications might be made without departing from the scope of the invention, as defined in the appended claims.

What is claimed is:

1. A computer device, comprising:
    a communication interface circuit configured to receive data from a remote device over a communication network; and
    a processing circuit configured to:
        store a plurality of predetermined resource addresses in a process control policy table, each of the plurality of predetermined resource addresses being associated with a respective process control policy that identifies execution privileges;
        record a resource address identifying a network location of a file responsive to downloading the file to the computer device, and associate the resource address with a first fingerprint of the file, wherein both the resource address and the first fingerprint are stored in a file logging table;
        generate a second fingerprint of the file responsive to launching a process in a restricted security context of a runtime execution environment based on the file, wherein the second fingerprint is generated after the first fingerprint has been recorded, and wherein the restricted security context comprises execution privileges based on a user account;
        embed a hook module in the process as the process is launched;
        intercept by the hook module a system call from the process;
        compare, outside of the restricted security context, the second fingerprint to the first fingerprint;
        if the second fingerprint matches the first fingerprint, retrieve the resource address from the file logging table associated with the first fingerprint using the second fingerprint as an index into the file logging table, wherein the file logging table is stored outside of the restricted security context;
        retrieve the process control policy associated with the retrieved resource address from the process control policy table using the retrieved source address as an index into the process control policy table; and
        dynamically elevate or degrade the execution privileges of the restricted security context according to the retrieved process control policy to allow or block the intercepted system call.

2. The computer device of claim 1, wherein dynamically elevating or degrading the execution privileges of the restricted security context comprises assigning a new security token to the security context and restarting the process.

3. The computer device of claim 1, wherein the hook module comprises a dynamic linked library (DLL).

4. The computer device of claim 1, wherein the processing circuit is further configured to dynamically grant local administrator privileges to the process when specified by the retrieved process control policy.

5. The computer device of claim 1, wherein each process control policy identifies execution privileges of files downloaded from network locations identified by a respective resource address.

6. The computer device of claim 1, wherein the processing circuit is further configured to record a corresponding resource address each time another file is downloaded to the computer device, thereby logging the corresponding resource address and a fingerprint for each downloaded file.

7. The computer device of claim 1, wherein the processing circuit is further configured to control a browser of the computer device to download the file to the computer device from the network location.

8. The computer device of claim 1, wherein the processing circuit is further configured to generate the second fingerprint of the file as a cryptographic hash.

9. The computer device of claim 1, wherein the system call comprises a call made to an application programming interface of an operating system of the computer device to create a new process.

10. The computer device of claim 1, wherein the processing circuit is further configured to:
    execute a kernel driver within an operating system of the computer device.

11. The computer device of claim 1, wherein the processing circuit is further configured to:
    execute a kernel driver within an operating system of the computer device; and
    receive a notification when a new process starts.

12. A method of controlling downloaded files in a computer device, the method comprising:
    storing a plurality of predetermined resource addresses in a process control policy table, each of the plurality of predetermined resource addresses being associated with a respective process control policy that identifies execution privileges;
    recording a resource address identifying a network location of a file responsive to downloading the file to the computer device, wherein both the resource address and the first fingerprint are stored in a file logging table;
    generating a second fingerprint of the file responsive to launching a process in a restricted security context of a runtime execution environment based on the file, wherein the second fingerprint is generated after the first fingerprint has been recorded, and wherein the restricted security context comprises execution privileges based on a user account;
    embedding a hook module in the process as the process is launched;
    intercepting by the hook module a system call from the process;
    comparing, outside of the restricted security context, the second fingerprint to the first fingerprint;
    if the second fingerprint matches the first fingerprint, retrieve the resource address from the file logging table associated with the first fingerprint using the second fingerprint as an index into the file logging table, wherein the file logging table is stored outside of the restricted security context;
    retrieving the process control policy associated with the retrieved resource address from the process control policy table using the retrieved source address as an index into the process control policy table; and
    dynamically elevating or degrading the execution privileges of the restricted security context according to the retrieved process control policy to allow or block the intercepted system call.

13. The method of claim 12 further comprising assigning a new security token to the security context and restarting the process.

14. The method of claim 12, wherein the hook module comprises a dynamic linked library (DLL).

15. The method of claim 12 wherein each process control policy identifies execution privileges of files downloaded from network locations identified by a respective resource address.

16. The method of claim 12 further comprising recording a corresponding resource address each time another file is downloaded to the computer device, thereby logging the corresponding resource address and a fingerprint for each downloaded file.

17. The method of claim 12 further comprising controlling a browser of the computer device to download the file to the computer device from the network location.

18. The method of claim 12, wherein the system call comprises a call made to an application programming interface of an operating system of the computer device to create a new process.

19. A tangible, non-transitory computer readable medium having instructions recorded thereon which, when implemented by a processor circuit on a computer device, causes the computer device to:

store a plurality of predetermined resource addresses in a process control policy table, each of the plurality of predetermined resource addresses being associated with a respective process control policy that identifies execution privileges;

record a resource address identifying a network location of a file responsive to downloading the file to the computer device, wherein both the resource address and the first fingerprint are stored in a file logging table;

generate a second fingerprint of the file responsive to launching a process in a restricted security context of a runtime execution environment based on the file, wherein the second fingerprint is generated after the first fingerprint has been recorded, and wherein the restricted security context comprises execution privileges based on a user account;

embed a hook module in the process as the process is launched;

intercept by the hook module a system call from the process;

compare, outside of the restricted security context, the second fingerprint to the first fingerprint;

if the second fingerprint matches the first fingerprint, retrieve the resource address from the file logging table associated with the first fingerprint using the second fingerprint as an index into the file logging table, wherein the file logging table is stored outside of the restricted security context;

retrieve the process control policy associated with the retrieved resource address from the process control policy table using the retrieved source address as an index into the process control policy table; and     dynamically elevate or degrade the execution privileges of the restricted security context according to the retrieved process control policy to allow or block the intercepted system call.

* * * * *